United States Patent [19]

Wilburn

[11] Patent Number: 4,801,230
[45] Date of Patent: Jan. 31, 1989

[54] RETAINER FOR A FASTENER

[75] Inventor: Douglas H. Wilburn, Logansport, Ind.

[73] Assignee: Elco Industries, Inc., Rockford, Ill.

[21] Appl. No.: 578,265

[22] Filed: Feb. 8, 1984

[51] Int. Cl.⁴ ............................................. F16B 13/06
[52] U.S. Cl. .................................... 411/61; 411/177; 411/520
[58] Field of Search ................ 411/546, 547, 531, 34, 411/35, 36, 37, 38, 520, 516, 352, 522, 427, 61, 369, 177

[56] References Cited

U.S. PATENT DOCUMENTS

| | | | |
|---|---|---|---|
| 1,161,155 | 11/1915 | Pleister | 411/34 |
| 1,209,489 | 12/1916 | Pierpont | |
| 1,664,890 | 4/1928 | Krejci | |
| 2,092,682 | 9/1937 | Roske | 411/531 |
| 2,130,597 | 9/1938 | Oldham | 411/516 X |
| 2,156,003 | 4/1939 | Tinnerman | 411/520 |
| 2,184,783 | 12/1939 | Tinnerman | 411/34 |
| 2,244,975 | 6/1941 | Tinnerman | 411/352 |
| 2,326,903 | 8/1943 | Tinnerman | 411/522 X |
| 2,368,027 | 1/1945 | Johnson | 411/522 |
| 2,404,928 | 7/1946 | Schutten | 411/427 X |
| 2,590,264 | 3/1952 | Meyers et al. | 411/61 X |
| 2,596,952 | 5/1952 | Crowther | 411/61 |
| 2,660,084 | 11/1953 | Newman | 411/522 |
| 2,831,520 | 4/1958 | Clarke | 151/69 |
| 2,894,425 | 7/1959 | Rapata | 85/8.8 |
| 3,299,766 | 1/1967 | Gould et al. | 411/369 X |
| 3,459,095 | 9/1967 | Hsu et al. | 411/545 |
| 3,962,775 | 6/1976 | King | 29/445 |
| 4,002,100 | 1/1977 | Bucheli | 411/61 |
| 4,123,640 | 10/1978 | Ballantyne | 200/296 |
| 4,289,061 | 9/1981 | Emmett | 411/38 X |
| 4,430,033 | 2/1984 | McKewan | 411/177 |

FOREIGN PATENT DOCUMENTS

| | | | |
|---|---|---|---|
| 628021 | 11/1961 | Italy | 411/61 |
| 608218 | 9/1948 | United Kingdom | 411/38 |

Primary Examiner—Gary L. Smith
Assistant Examiner—Rodney M. Lindsey
Attorney, Agent, or Firm—Leydig, Voit & Mayer, Ltd.

[57] ABSTRACT

A retainer includes a cylindrical sleeve projecting downwardly into a hole in a plate with a flange at the lower end of the sleeve engaging the underside of the plate. Resilient fingers struck out from the sleeve engage the top of the plate to cooperate with the flange in holding the sleeve in place. A fastener initially is threaded along dimples in the sleeve to hold the fastener while permitting the latter to be threaded down into a member beneath the plate. As the fastener is threaded down, its head engages the sleeve which is crushed between the head and the plate so as to be out of the way.

9 Claims, 1 Drawing Sheet

RETAINER FOR A FASTENER

BACKGROUND OF THE INVENTION

This invention relates to an assembly in which a plate is secured to a rigid member by a threaded fastener which projects through a hole in the plate and is threaded into the member. In some commercial applications such as roof constructions, it is desirable to preassemble a plurality of fasteners with a plate, which may be part of a clip, and to ship the plate and the fasteners in this condition.

SUMMARY OF THE INVENTION

The general object is to provide a novel retainer which holds a fastener on the plate and ready to be driven and is automatically out of the way after the fastener has been driven so that the fastener may be shipped with the plate and nothing more is required other than to position the plate and drive the fastener.

A more detailed object is to form the retainer as a cylindrical sleeve which is held in place on the plate by a novel arrangement of a flange and resilient fingers integral with the sleeve and to make the wall of the sleeve thin enough that it is crushed under the head of the fastener as the latter is driven so that the sleeve then is out of the way and does not interfere with the holding action of the fastener.

DETAILED DESCRIPTION OF THE PREFERRED EMBODIMENT

Figure 1:
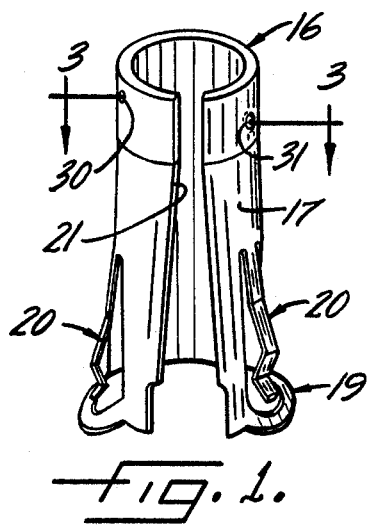
FIG. 1 is a perspective view of a retainer embodying the present invention.

As shown in the drawings for purposes of illustration, the invention is used in fastening a plate 10 (FIG. 5) to an anchor member 11 by means of a threaded fastener 12 and is particularly useful in a roof construction where the plate is part of a clip and the anchor member is a purlin. The fastener may be conventional in construction and herein includes a head 13, a threaded shank 14 and a drilling tip 15. The invention contemplates the provision of a novel retainer 16 which permits the fastener 12 to be preassembled with the clip 10 with the fastener ready to be driven into the purlin 11, which holds the fastener in this preassembled condition both during shipping and while the clip is positioned preparatory to the fastener being driven but which is out of the way after the fastener has been driven. In this way, the fasteners may be driven easily and quickly without first being individually positioned and then held in place. Also according to the invention, the retainer is made so that it is crushed as the fastener is driven and remains in place but in this way does not interfere with the holding action of the fastener.

Figure 6:
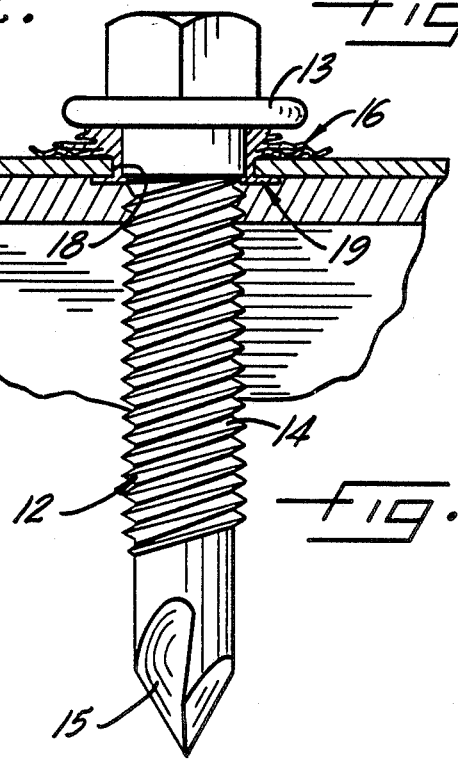
FIG. 6 is a view similar to FIG. 5 but showing the fastener fully driven.

In general, the retainer 16 includes a cylindrical sleeve 17 which is adapted to have its lower end portion received in a hole 18 in the clip 10 and a radial flange 19 projects outwardly from the lower end of the sleeve to underlie and abut the clip so as to prevent the sleeve from being lifted out of the hole. A plurality of resilient fingers 20 project downwardly and outwardly from the body of the sleeve and engage the upper side of the clip to prevent the sleeve from moving downwardly through the hole. The fastener 12 initially is held in the sleeve and, after the clip 10 has been positioned properly relative to the purlin 11, the fastener is driven into the purlin. The wall of the sleeve is thin enough so as to be crushable and, as a result, the sleeve is flattened between the head 13 and the purlin as the fastener is driven as illustrated in FIG. 6. When the fastener is completely driven, the sleeve is out of the way under the head and remains in the completed construction.

Figure 3:
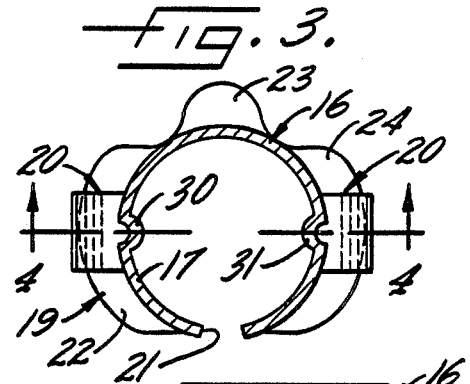
FIG. 3 is an enlarged sectional view taken along the line 3—3 in FIG. 1.

Herein, the sleeve 17 is made of sheet metal and is split longitudinally as indicated at 21 so that the diameter of the sleeve, which normally is slightly larger than the diameter of the hole 18, may be contracted to permit the sleeve to be inserted in the hole. The flange 19 is struck out from the lower end of the sleeve and, inasmuch as it is not normally subjected to any large forces, it is made up of three tabs 22, 23 and 24 (FIG. 3) which are generally contiguous except that they are interrupted at the split 21 in the sleeve.

Figures 2, 4:
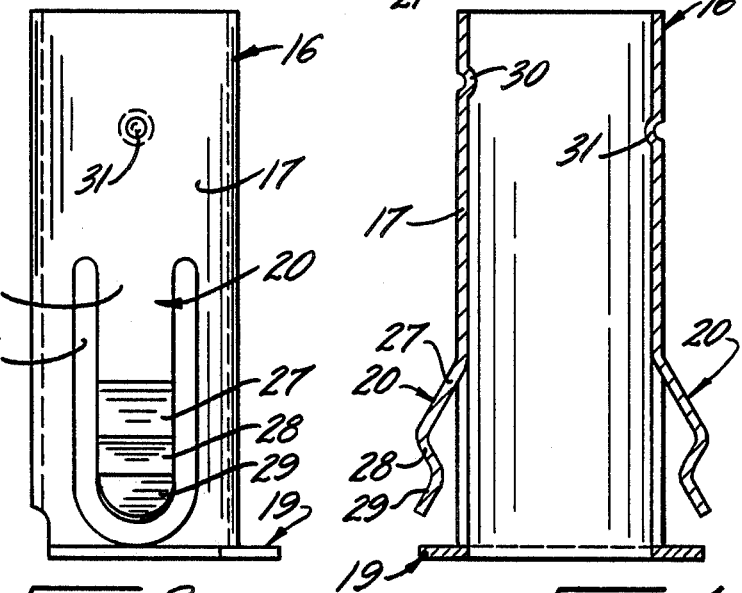
FIG. 2 is an enlarged elevational view of the retainer.
FIG. 4 is a sectional view taken along the line 4—4 in FIG. 3.

The fingers 20, which herein are two in number, also are struck out of the sleeve 17 on diametrically opposite sides of the latter and each is defined by a U-shaped slot 25 (FIG. 2) in the sleeve. The upper end of each slot terminates at about the longitudinal midpoint of the sleeve to define the base 26 of the associated finger. From this base, the upper position 27 of the finger projects downwardly and outwardly and the finger is bent so that the center portion 28 extends inwardly and the free end portion 29 parallels the upper portion. The space between the lower ends of the fingers 20 and the flange tabs 22 and 24 is about equal to the thickness of the clip plate 10 so that the fingers abut the top of the plate and cooperate with the tabs in holding the sleeve in place.

Means are provided for holding the fastener 12 in the sleeve 17 while the clip and fastener assembly is shipped and while it is positioned on the purlin 11 preparatory to driving the fastener. This means permits the fastener to be threaded down and, herein, is composed of a plurality of dimples formed in the sleeve and correlated with the pitch of the thread 14. In the preferred embodiment, two dimples 30 and 31 are formed in the sleeve and their positions along the sleeves are staggered axially and angularly to match the thread pitch so that, in effect, the two dimples together form a partial thread mating with the screw thread. Thus, when driven, the screw is threaded past the dimples as well as into the purlin.

Figure 5:
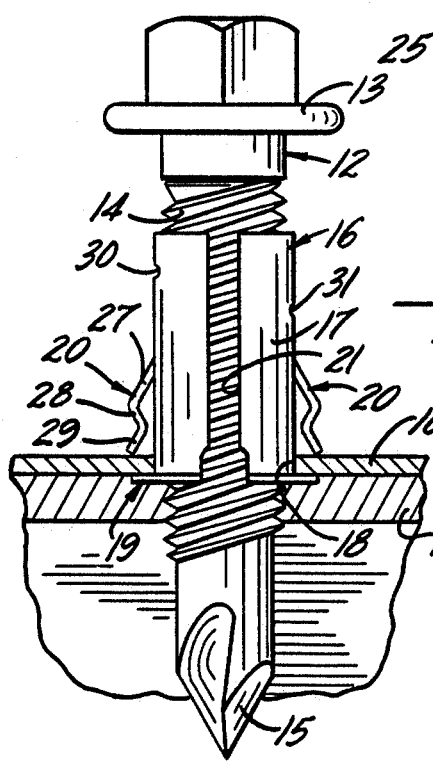
FIG. 5 is a sectional view showing a retainer and a fastener before the fastener is fully driven.

To assemble the retainer 16 and the clip plate 10, the sleeve 17 is contracted until its diameter is somewhat less than that of the hole 18 and the sleeve is inserted up through the hole from the underside of the plate. During this insertion, the upper portions 27 of the fingers 20 engage the side of the hole and resiliently cam the fingers in to permit them to pass through the hole. When the flange 19 abuts the underside of clip plate 10, the fingers have cleared the plate and spring out above the latter as illustrated in FIG. 5 whereby the fingers and the flange act together to hold the retainer in place in the hole. The screw 12 then is inserted in the sleeve and threaded down on the dimples 30 and 31 until the tip 15 is adjacent the bottom of the sleeve and this completes the assembly.

I claim:

1. The combination of a plate having a circular hole and an elongated threaded fastener having an upper head and having a shank projecting downwardly through the hole to be threaded into an underlying member, a cylindrical sleeve projecting downwardly into said hole, a flange projecting radially outwardly from the lower end of said sleeve and underlying said plate to prevent the sleeve from being moved upwardly out of said hole, a plurality of resilient fingers normally projecting downwardly and outwardly from said sleeve to engage the upper side of said plate and prevent the sleeve from being moved downwardly through said hole, said fingers resiliently moving inwardly as said sleeve is inserted into said hole from the underside of said plate and then springing outwardly to engage the upper side of the plate, and means on said sleeve for holding said fastener in the sleeve while permitting the fastener to be threaded down into said underlying member, said sleeve being crushable so as to be flattened between the lower side of said head and the upper side of said plate as said fastener is threaded downwardly into said underlying member.

2. The combination as defined in claim 1 in which said sleeve is split longitudinally and said flange is interrupted at the split in the sleeve to permit the sleeve to be contracted while being inserted into said hole.

3. The combination as defined in claim 1 in which said means is a partial thread formed on the inside of said sleeve and engaging said fastener.

4. The combination as defined in claim 3 in which said partial thread is made up of a plurality of axially and angularly spaced dimples.

5. The combination of a plate having a circular hole and an elongated threaded fastener having an upper head and having a shank projecting downwardly through the hole to be threaded into an underlying member, a cylindrical sleeve projecting downwardly into said hole, a flange projecting radially outwardly from the lower end of said sleeve and underlying said plate to prevent the sleeve from being moved upwardly out of said hole, a plurality of resilient fingers normally projecting downwardly and outwardly from the central portion of said sleeve to engage the upper side of said plate and prevent the sleeve from being moved downwardly through said hole, said fingers being integral with said sleeve and struck out of the latter, said fingers resiliently moving inwardly as said sleeve is inserted into said hole from the underside of said plate and then springing outwardly to engage the upper side of the plate, and means on said sleeve for holding said fastener in the sleeve while permitting the fastener to be threaded down into said underlying member, said sleeve being crushable so as to be flattened between the lower side of said head and the upper side of said plate as said fastener is threaded downwardly into said underlying member.

6. The combination of a plate having a circular hole and an elongated threaded fastener having an upper head and having a shank projecting downwardly through the hole to be threaded into an underlying member, a cylindrical sleeve projecting downwardly into said hole, a flange projecting radially outwardly from the lower end of said sleeve and underlying said plate to prevent the sleeve from being moved upwardly out of said hole, a plurality of resilient fingers normally projecting downwardly and outwardly from said sleeve to engage the upper side of said plate and prevent the sleeve from being moved downwardly through said hole, said fingers resiliently moving inwardly as said sleeve is inserted into said hole from the underside of said plate and then springing outwardly to engage the upper side of the plate, and a plurality of dimples projecting inwardly from said sleeve with the positions of the dimples being correlated with the pitch of the thread of said fastener to hold the fastener in the sleeve while permitting the fastener to be threaded down into said underlying member, the wall of said sleeve being comparatively thin whereby the sleeve is crushable so as to be flattened between the lower side of said head and the upper side of said plate as said fastener is threaded into said underlying member.

7. A fastener assembly for use with a plate having a hole, said fastener assembly comprising a fastener having a driving head and having an elongated threaded shank extending from said head, a sleeve encircling an axial portion of said shank and sized to project through said hole, said sleeve having a head end portion facing said driving head and having a shank end portion facing the free end of said threaded shank, a flange projecting radially outwardly from the shank end portion of said sleeve and engageable with one side of said plate to prevent the sleeve from being moved out of said hole in one direction, a plurality of resilient fingers projecting outwardly from said sleeve and away from the head end portion thereof to engage the other side of said plate and prevent said sleeve from being moved out of said hole in the opposite direction, said fingers resiliently moving inwardly as said sleeve is inserted into said hole from said one side of said plate and then springing outwardly to engage the other side of the plate, and means on said sleeve for holding said fastener axially in said sleeve while permitting said fastener to be rotated, said sleeve being crushable so as to be flattened between said head and said other side of said plate when said shank is threaded into a member adjacent said one side of said plate.

8. A fastener assembly as defined in claim 7 in which said sleeve is split longitudinally and said flange is interrupted at the split in the sleeve to permit the sleeve to be contracted while being inserted into said hole.

9. A fastener assembly as defined in claim 8 in which said means is a partial thread formed on the inside of said sleeve and engaging said threaded shank.

* * * * *